June 23, 1953  R. G. PITT  2,643,079
HANGER FOR SUPPORTING ELONGATED OBJECTS
Filed Nov. 3, 1950 2 Sheets—Sheet 1
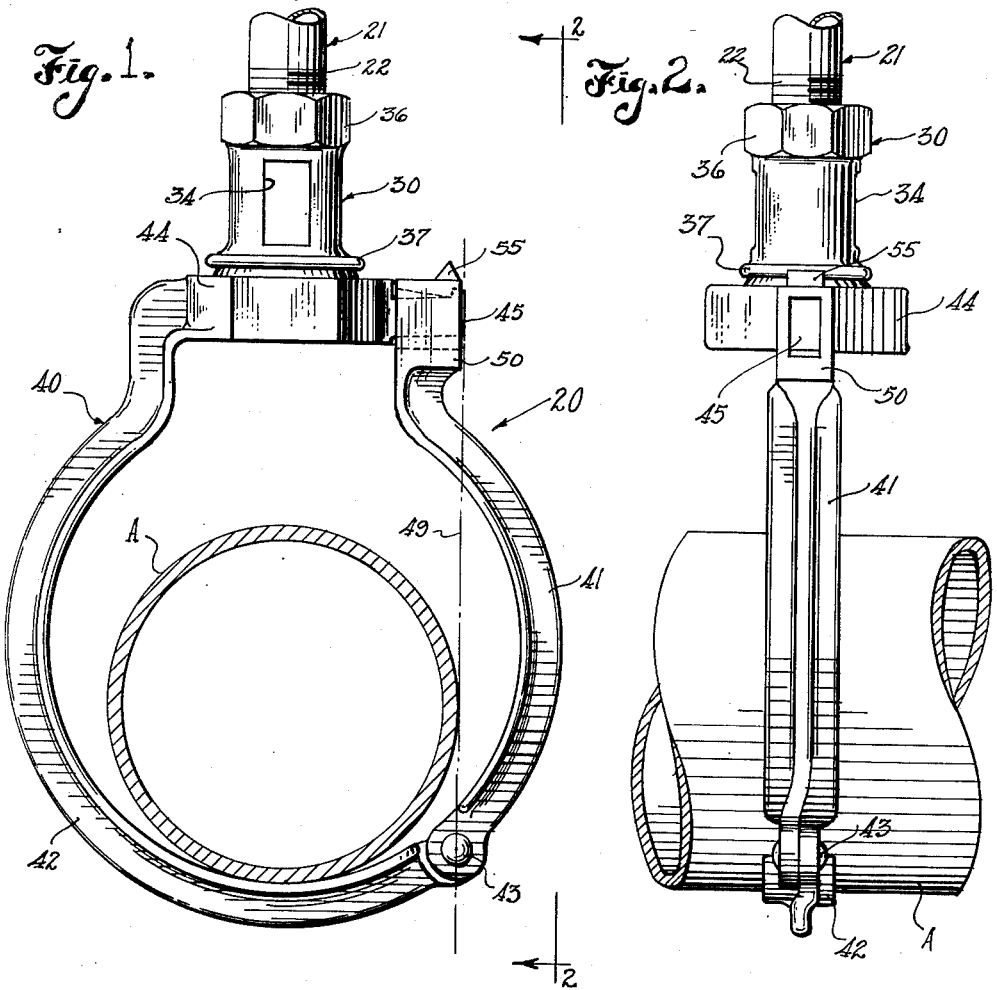
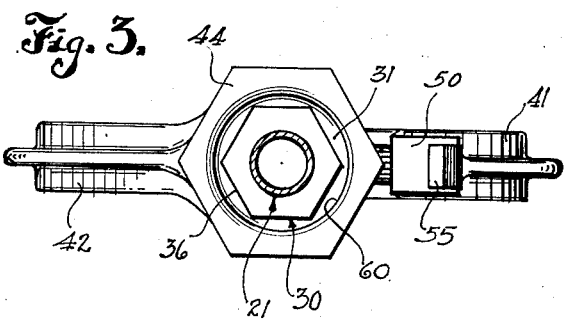
INVENTOR:
Raymond George Pitt
BY: Joseph M. Gartner,
ATTY.

June 23, 1953  R. G. PITT  2,643,079
HANGER FOR SUPPORTING ELONGATED OBJECTS
Filed Nov. 3, 1950  2 Sheets-Sheet 2
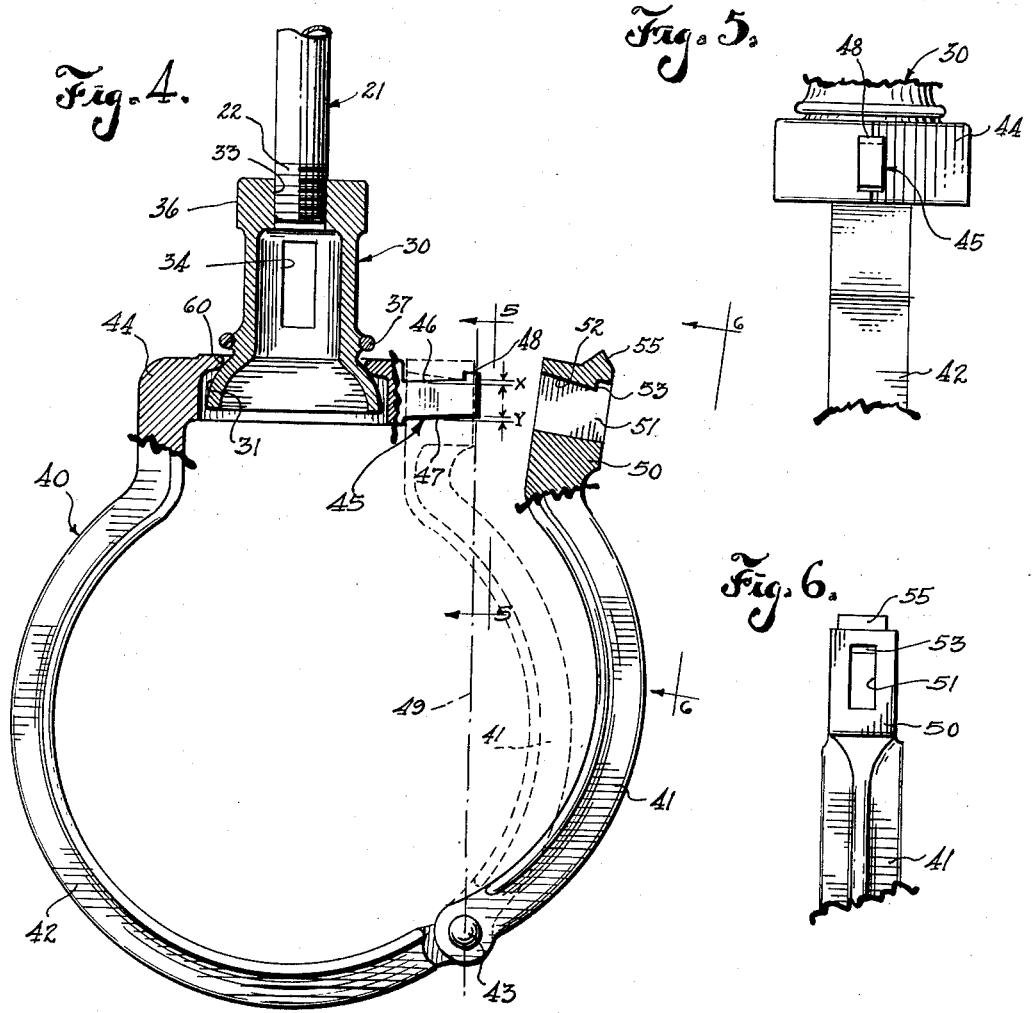
INVENTOR:
Raymond George Pitt,
BY
Joseph M. Gartner,
ATTY.

Patented June 23, 1953

2,643,079

UNITED STATES PATENT OFFICE 2,643,079

HANGER FOR SUPPORTING ELONGATED OBJECTS

Raymond George Pitt, Chicago, Ill.

Application November 3, 1950, Serial No. 193,971

1 Claim. (Cl. 248—62)

This invention relates in general to pipe hangers and is particularly concerned with a device which may be employed primarily to suspend pipes or other elongated devices from a ceiling and is designed to support elongated members of circular cross section to be suspended in a substantially horizontal position.

Otherwise stated, the invention is embodied in a pipe hanger which, by means of a flexible joint between the main support and the pipe supporting member will permit a limited movement of the pipe in either a longitudinal or lateral direction, without causing excess strain on either the pipe suspending member or the main supporting member.

More specifically stated, it is a particular object and accomplishment of the invention to provide a pipe hanger of the character hereinbefore described, said pipe hanger having a lateral outlet and a closing member therefor, so that the elongated pipes to be suspended can be conveniently and easily placed within the encircling arms of the pipe hanger.

Another object and accomplishment of the invention is to provide means whereby the hinged arm of the hanger, which permits the lateral entrance of the elongated pipe to the pipe hanger, can be securely locked in position and easily opened without necessitating the employment of tools or causing destruction of the hanger, this opening being accomplished for the purpose of easy and convenient removal or replacement of the pipe.

Another object and accomplishment of the invention is to provide an improved pipe hanger by correlating and especially designing the various elements thereof to effect advantageous cooperation between said improved elements as will best serve the purpose of providing an efficient system capable of being manufactured at low cost and yet giving the maximum of satisfactory service in use.

An ancillary object and accomplishment of the invention is to provide a new and improved pipe hanger which is adapted to be economically manufactured and which is so designed as to permit the manufacture and assembly thereof in accordance with present day large scale mass production manufacturing methods of construction and assembly.

The invention seeks, as a further object and accomplishment, to provide a pipe hanger particularly characterized by a design arrangement to more advantageously and satisfactorily perform the functions required of it and adapted to provide a compact unit which will successfully combine the factors of structural simplicity and durability, and yet be economical to manufacture.

Additional objects, features and advantages of the invention disclosed herein will be apparent to persons skilled in the art after the operation and construction thereof are understood from the within description.

It is preferred to accomplish the various objects of this invention and to practice the same in substantially the manner as hereinafter more fully described, and as more particularly pointed out in the appended claim.

Embodiments of the invention are illustrated in the accompanying drawings which form a part hereof and wherein:

Fig. 1 is an elevational view of a pipe hanger embodying the features of the present invention;

Fig. 2 is a side elevational view of the pipe hanger depicted in Fig. 1 and being taken substantially on the plane of the line 2—2 in Fig. 1;

Fig. 3 is a top plan view of the pipe hanger depicted in Fig. 1;

Fig. 4 is an elevational view of the pipe hanger depicted in Fig. 1 with parts thereof shown in section to more clearly illustrate the construction thereof and the operation of the lateral opening closure means;

Fig. 5 is an elevational view of a portion of the lateral opening closure locking means and being taken substantially on the plane of the line 5—5 in Fig. 4; and Fig. 6 is an elevational view of a portion of the lateral opening closure locking means cooperating with that disclosed in Fig. 5 and being taken substantially on the plane of the line 6—6 in Fig. 5.

The drawings are to be understood as being more or less of a schematic character for the purpose of illustrating and disclosing a typical or preferred form of the improvements contemplated herein and in the drawings like reference characters identify the same parts in the several views.

In the exemplary embodiment of the invention depicted in Figs. 1, 2 and 4, the pipe hanger indicated in its entirety by the numeral 20 comprises, in general, a supporting rod 21 having upper end portions thereof (not shown) firmly fixed to a roof truss member or the ceiling or any other convenient means of support; a coupling 30 adjustably attached to lower end portions of the supporting rod 21; and a supporting loop 40 for cradling the pipe A to be suspended; the relative disposition of these elements and their co-action providing (1) a flexible joint between the coupling 30 and the pipe supporting loop 40, (2) a hinged arm 41 in the supporting loop 40 which by a lateral pivotal movement (Fig. 4) will provide an opening in the loop to permit convenient and easy entry for the pipe A, and (3) a locking means for said hinged arm to maintain the loop in supporting relationship with the pipe A.

In accordance with the construction of the present invention, the pipe A to be supported is cradled in the annular shaped loop 40 having two main elements: (1) an encircling segment 42, and (2) the hinged arm segment 41. These two segments define the complete loop 40 and are hinged together by a rivet or the like 43 about which the two segments may move laterally with respect to each other.

On the upper regions of the encircling segment and integral therewith is formed a terminal 44 centrally disposed on the upper regions of the supporting loop 40.

Integrally formed with the terminal 44 and projecting laterally therefrom is a lug 45 (Figs. 4 and 5) which comprises one part of the locking means for said hinged arm 41. The lug 45 is substantially rectangular shaped in cross section with the top and bottom surfaces, respectively indicated at 46 and 47, disposed at a slight incline off the horizontal as indicated by the dimensions X and Y in Fig. 4. Integrally formed with said lug and disposed adjacent the outer end thereof and projecting upwardly therefrom is a latch stop 48. The importance of the inclined surfaces 46 and 47 and relative disposition of the latch stop 48 will become apparent as the description proceeds. In Figs. 1 and 4 it can be seen that the line 49 is vertical and passes through the center of the rivet 43 and that the lug 45 projects laterally outwardly from the terminal 44 to the plane defined by the line 49.

On the upper regions of the hinged arm 41 and integrally formed therewith is a latch body 50 of substantially rectangular shape and having a rectangular shaped through opening 51 adapted to receive portions of the lug 45 when in the latched position. In Figs. 4 and 6 it can be seen that the opening 51 is provided with an inclined surface 52 terminating in a catch 53 adapted to cooperate with the latch stop 48 to effectively latch the hinged arm 41 in its latched position.

Thus it can be seen in Fig. 4 that the latch stop 48 will engage the inclined surface 52 when the hinged arm is being placed in its latched position and upon exertion of slight manual force, the hinged arm can be forced home whereupon the interaction of the latch stop 48 and the catch 53 will effectively latch the hinged arm in its latched position. When it is desired to open the hinged arm 41 for the purpose of removing the pipe A from the hanger, the hinged arm is lifted slightly at a distance to overcome the interlocking effect of the latch stop 48 and the catch 53 whereupon the hinged arm may be pulled laterally outwardly to its open position. In order to accomplish this action it is desirable to have a fairly loose fit about the rivet 43 so as to permit slight displacement or movement in a vertical plane.

The hinged arm 41 conveys its pull, with respect to load bearing, to the terminal 44 by the interaction between the surface 52 of the latch body 50 and the top surface 46 of the lug 45. For successful operation of the hanger it is essential to keep these bearing surfaces in contact and to prevent lateral movement outwardly of the hinged arm 41 which is accomplished by the effective cooperation of the latch stop 48, the catch 53 and the downward pull of the load which assist in keeping these elements in their latched position.

Disposed on the top surface of the latch body 50 there is a triangular shaped projection 55 which may be employed as a grip for a suitable tool (not shown) or a hammer block when it is necessary to drive the latch body home, this being only necessary in unusual circumstances when the hanger is unduly stressed because of heavy loads.

In Fig. 4 it can be seen that the terminal 44 has on its upper end an inwardly turned radial flange 60 whose beaded surface rides upon the arcuate surface of a semi-spherical skirt 31 forming a part of the coupling 30, said semi-spherical skirt forming the ball of the flexible joint between the pipe holding loop and the coupling 30 while the bead on the flange 60 defines a modified socket, and the interactions between these two surfaces permit the pipe a limited movement in either a lateral or longitudinal direction. In order to attain this action, the internal diameter of the terminal 44 must be slightly larger than the largest diameter of the skirt, while the largest diameter of the skirt must be larger than the inside diameter of the inwardly extending flange 60. Moreover, the diameter of the upper end of the skirt 31 where it joins integral with the coupling 30 must be smaller than the internal diameter of the flange bead. It is desirable that the bead should ride approximately midway on the skirt 31 when the hanger is in its normal operating position depicted in Figs. 1 and 4.

The coupling 30 may be attached to the supporting rod 21 by interlocking thread formations respectively indicated at 22 and 33 which are adapted to permit longitudinal adjustment between the rod and coupling to control the position of the pipe supporting loop in order that the operator may distribute the weight of the pipe A equally between the various supporting hangers. This adjustment may be advantageously accomplished because of the provision of oppositely disposed apertures 34 which have a dual purpose of (1) permitting the operator to observe the exact position of the threaded relation between the threaded end portions of the rod 21 and the threaded aperture of the coupling 30, and (2) facilitating convenient application in applying the coupling 30 to the rod 21 because the apertures 34 can be employed for tightening or loosening the coupling 30 by employing a rod or any stiff rigid member which may be placed in the apertures and a force may be applied to this member to turn the coupling 30. The coupling 30 is provided with additional means to attain this turning movement by having a hexagonal section 36 positioned on the upper end of the coupling. By applying a wrench to this section, the coupling can be turned with ease.

The parts of the flexible joint are made separately and then assembled by introducing the coupling 30 through the aperture in the terminal 44 so as to bring the semi-spherical skirt 31 into operable contact with the flange 60. In order that these parts may be maintained in their assembled relationship and to provide a convenient means for disassembly there is provided the snap ring 37 which encircles the coupling and may be placed in its proper position after the coupling has been inserted into the aperture of the terminal 44 and may be conveniently removed to permit removal of the coupling 30.

The instant pipe hanger, being formed of simple parts and readily available materials, lends itself to mass production manufacturing principles, thus affording a substantial saving in the manufacturing costs.

From the disclosure, it may be observed that I have provided an improved pipe hanger incorporating an improved locking means which efficiently fulfills the objects thereof as hereinbefore stated and which provides numerous advantages which may be summarized as follows:

1. Structurally simple, efficient and durable;
2. Economical to manufacture and readily adaptable to mass production manufacturing principles; and
3. The provision of a pipe hanger incorporating an improved locking means whereby the hinged arm of the hanger, which permits the lateral entrance of the elongated pipe to the pipe hanger, can be securely locked in position and easily opened without necessitating the employment of tools or causing destruction of the hanger, this opening being accomplished for the purpose of easy and convenient removal or replacement of the pipe.

While I have illustrated a preferred embodiment of my invention, many modifications may be made without departing from the spirit of the invention, and I do not wish to be limited to the precise details of construction set forth but wish to avail myself of all changes within the scope of the appended claim.

I claim:

A hanger providing a pendant supporting member comprising: means defining a two-segment ring carried by said support, the first segment of said ring being hingedly connected at one end to an end of the second segment which is remote to said pendant support for effecting swinging movement of said first segment with respect to said second segment; means defining a terminal at the end of the second segment which is nearest the support having a central aperture with an annular boss, said pendant support having a bell-shaped portion projecting into said central aperture and engaged by said annular boss effecting universal movement therebetween; means defining a snap ring embracing said pendant support and engageable with portions of said terminal restricting separating movement of said pendant support with respect to said terminal; and a latching assembly detachably connecting portions of said first segment with portions of said terminal, said latching assembly comprising a lug projecting radially outwardly from said terminal into the path of movement of said first segment and having a first surface inclined in an upward outward plane with an upstanding latch stop at its outer region, a latch head on the end of said first segment adjacent said lug and having therein a substantially rectangular shaped through opening the internal surfaces of which define a counterpart of said lug and include a second inclined surface and an abutment, said lug being arranged to project through said through opening, said second inclined surface and abutment coacting with said latch stop, and the hinge connection between said first and second segments having sufficient clearance therein facilitating bodily manually raising of said first segment with respect to said second segment to effect disengagement of said abutment with said latch stop.

RAYMOND GEORGE PITT.

References Cited in the file of this patent

UNITED STATES PATENTS

| Number | Name | Date |
|---|---|---|
| 325,051 | Cadwallader | Aug. 25, 1885 |
| 545,775 | Clark | Sept. 3, 1895 |
| 624,671 | O'Brien | May 9, 1899 |
| 981,769 | Kinowski | Jan. 17, 1911 |
| 1,862,337 | Emrick | June 7, 1932 |
| 1,966,899 | McCabe | July 17, 1934 |
| 2,456,355 | Aber | Dec. 14, 1948 |